(12) United States Patent
Okamoto et al.

(10) Patent No.: US 10,696,140 B2
(45) Date of Patent: Jun. 30, 2020

(54) AIR CONDITIONER FOR VEHICLE

(71) Applicant: DENSO CORPORATION, Kariya, Aichi-pref. (JP)

(72) Inventors: Tsuyoshi Okamoto, Kariya (JP); Takayuki Watanabe, Kariya (JP)

(73) Assignee: DENSO CORPORATION, Kariya (JP)

(*) Notice: Subject to any disclaimer, the term of this patent is extended or adjusted under 35 U.S.C. 154(b) by 108 days.

(21) Appl. No.: 15/776,112

(22) PCT Filed: Oct. 21, 2016

(86) PCT No.: PCT/JP2016/081197
§ 371 (c)(1),
(2) Date: May 15, 2018

(87) PCT Pub. No.: WO2017/119173
PCT Pub. Date: Jul. 13, 2017

(65) Prior Publication Data
US 2018/0370332 A1    Dec. 27, 2018

(30) Foreign Application Priority Data
Jan. 7, 2016 (JP) .................................. 2016-001926

(51) Int. Cl.
*B60H 1/32* (2006.01)
*B60H 1/03* (2006.01)
(Continued)

(52) U.S. Cl.
CPC .............. *B60H 1/3213* (2013.01); *B60H 1/03* (2013.01); *B60H 1/08* (2013.01); *F01P 3/20* (2013.01);
(Continued)

(58) Field of Classification Search
CPC .......... B60H 1/3213; B60H 1/08; B60H 1/03; B60H 1/22; B60H 2001/3255; F01P 3/20;
(Continued)

(56) References Cited

U.S. PATENT DOCUMENTS

2012/0205088 A1* 8/2012 Morisita ............ B60H 1/00921
165/202

FOREIGN PATENT DOCUMENTS

DE    102004031898 A1 *  1/2006
DE    102013006155 A1 * 10/2014
JP       2007-283830 A   11/2007

* cited by examiner

Primary Examiner — Larry L Furdge
(74) Attorney, Agent, or Firm — Oliff PLC

(57) ABSTRACT

An air conditioner for a vehicle including an engine, which serves as a power source and is configured to allow a cooling water to flow therethrough, includes a cooling water circuit, a heater, temperature sensors, and an output controller. The cooling water circuit allows the cooling water to circulate therein in a heating operation. The heater serves as a heat source, other than the engine, configured to heat the cooling water circulating in the cooling water circuit. The temperature sensors are connectable to the cooling water circuit and are configured to detect a temperature of the cooling water. The temperature sensors are positioned upstream and downstream of at least one of the engine and the heater. The output controller is configured to adjust at least an output of the heater based on the temperatures of the cooling water detected by the temperature sensors.

10 Claims, 11 Drawing Sheets

(51) Int. Cl.
 *B60H 1/08*   (2006.01)
 *F01P 3/20*   (2006.01)
 *B60H 1/22*   (2006.01)
(52) U.S. Cl.
 CPC ........ *B60H 1/22* (2013.01); *B60H 2001/3255* (2013.01); *F01P 2025/30* (2013.01); *F01P 2025/32* (2013.01); *F01P 2050/24* (2013.01); *F01P 2060/08* (2013.01)
(58) Field of Classification Search
 CPC ............... F01P 2050/24; F01P 2025/30; F01P 2025/32; F01P 2060/08
 See application file for complete search history.

AIR CONDITIONER FOR VEHICLE

CROSS REFERENCE TO RELATED APPLICATION

This application is based on and claims the benefit of priority from Japanese Patent Application No. 2016-001926 filed on Jan. 7, 2016. The entire disclosure of the application is incorporated herein by reference.

TECHNICAL FIELD

The present disclosure relates to air conditioners for a vehicle. Such air conditioners may include a heater that is configured to heat air using the heat of cooling water for an engine that is a power source for the vehicle.

BACKGROUND ART

Hybrid vehicles are widely used in recent years due to societal demand requesting to improve fuel consumption and to reduce the exhaust gas. Such hybrid vehicles may include the engine and a motor as power sources. For example, the hybrid vehicles may improve the fuel consumption by operating EV-driving mode that moves the vehicle by the motor while stopping the engine. However, the fuel consumption tends to deteriorate in winter since a time period in which the engine is operated becomes longer to generate a required amount of heat required for a heating operation of the air conditioners. The amount of heat may be an amount of heat from the cooling water for the engine.

Patent Literature 1 discloses an air conditioner for a vehicle that mounts a heater, which is a heat source other than the engine, configured to heat the cooling water. The heater includes a heat pump and an exhaust-heat recovery device. The heater includes a heat pump and an exhaust-gas recovery device. A rotational speed of a compressor for the heat pump based on a temperature of the cooling water, a temperature of the exhaust gas, and a load applied to the engine. As a result, power consumption of the heat pump is reduced.

PRIOR ART LITERATURES

Patent Literature

Patent Literature 1: JP 2007-283830 A

SUMMARY OF INVENTION

Even when a water temperature of the cooling water in the engine outlet, the exhaust-gas temperature, or an engine load applied to the engine is fixed, an amount of heat used to heat the engine varies when a factor such as a water temperature of the cooling water in the engine inlet or an inside temperature of the engine changes. The amount of heat used to heat the cooling water is, in other words, an amount of heat transferring from the engine to the cooling water. As a result, in a control system that controls the heat pump based on the cooling water temperature, exhaust gas temperature, and the engine load, output form the heat pump may increase even when amount of heat is large. Thus, the output from the heat pump possibly becomes too large, and therefore the fuel consumption may not be improved efficiently.

It is an objective of the present disclosure to provide an air conditioner for a vehicle that includes a system including a heater, which is configured to heat the air using the heat of the cooling water for an engine, and that can improve the fuel consumption of the vehicle.

As an aspect of the present disclosure, an air conditioner for a vehicle including an engine, which serves as a power source and is configured to allow a cooling water to flow therethrough, includes a cooling water circuit, a heater, temperature sensors, and an output controller. The cooling water circuit allows the cooling water to circulate therein in a heating operation. The heater serves as a heat source, other than the engine, configured to heat the cooling water circulating in the cooling water circuit. The temperature sensors are connectable to the cooling water circuit and are configured to detect a temperature of the cooling water. The temperature sensors are positioned upstream and downstream of at least one of the engine and the heater. The output controller is configured to adjust at least an output of the heater based on the temperature of the cooling water detected by the temperature sensors.

According to the above-described configuration, an amount of heat, which is used by the heat source positioned between the temperature sensors to heat the cooling water, can be determined based on the temperature of the cooling water detected by the temperature sensors. Accordingly, the output of the heater is adjusted based on the temperature of the cooling water detected by the temperature sensors, thus the output of the heater can be adjusted based on the amount of heat used by the heat source to heat the cooling water. As a result, the output of the heater can be prevented from increasing excessively, and the fuel consumption can be improved.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
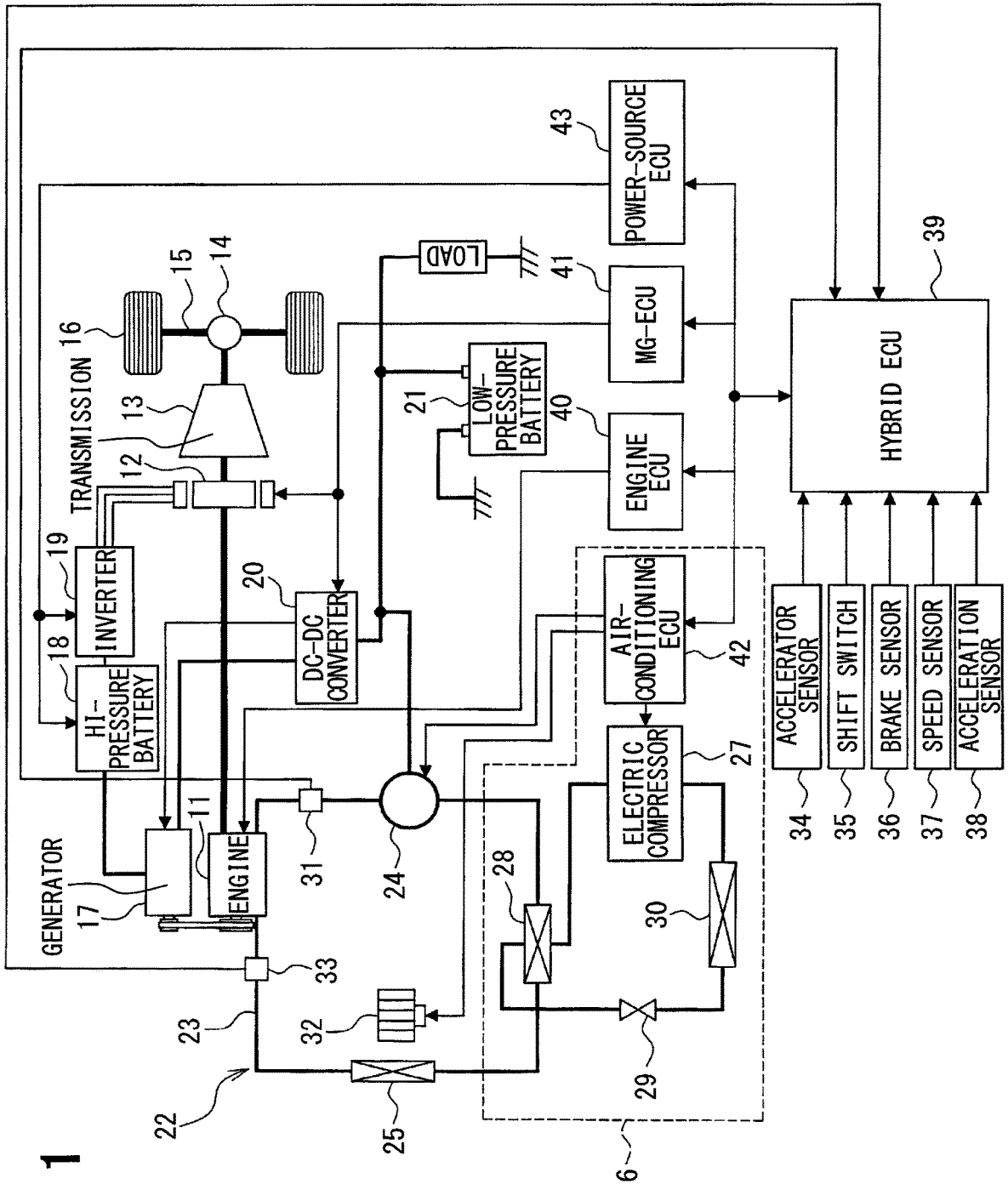
FIG. 1 is a schematic diagram showing a control system mounted to a hybrid vehicle in a first embodiment.

Embodiments of the present disclosure will be described hereinafter referring to drawings. In the embodiments, a part that corresponds to or equivalents to a part described in a preceding embodiment may be assigned with the same reference number, and a redundant description of the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment will be described hereafter referring to FIG. 1 to FIG. 7.

First, a schematic diagram of a control system in a hybrid vehicle will be described referring to FIG. 1.

The hybrid vehicle mounts an engine 11, i.e., an internal combustion engine, and a motor generator 12 that serve as power sources of the hybrid vehicle. The motor generator 12 will be referred to as MG 12 hereinafter. When an output shaft, i.e., a crank shaft, of the engine 11 generates power, the power transmits to a transmission 13 through the MG 12. An output shaft of the transmission 13 generates power, and the power transmits to wheels 16, i.e., drive wheels, through a component such as a differential gear mechanism 14 or a wheel axis 15. For example, the transmission 13 may be a variable transmission that includes a plurality of steps and shifts the steps one another to change a speed of the vehicle or may be a non-variable transmission (i.e., CVT) that changes the speed of the vehicle without shifting steps.

A rotary shaft of the MG 12 is connected to a power transmitting path, which is configured to transmit the power generated by the engine 11 to the wheels 16, to be transmittable the power. The rotary shaft is located between the engine 11 and the transmission 13 in the power transmitting path. A crutch may be mounted to the power transmitting path between the engine 11 and the MG 12 to stop and start the transmission of the power. The crutch may be located between the MG 12 and the transmission 13.

The engine 11 drives a generator 17. The power generated by the generator 17 is stored in a high-pressure battery 18. The MG 12 is operated by an inverter 19. The inverter 19 is connected to the high-pressure battery 18. Thus, the power is transferred between the MG 12 and the high-pressure battery 18 through the inverter 19. The generator 17 is connected to a low-pressure battery 21 through a DC-DC converter 20.

The high-pressure battery 18 and the low-pressure battery 21 are configured to store and supply the power and are in communication with each other through the DC-DC converter 20. The DC-DC converter 20 is connected to a low-pressure load that consumes the power supplying thereto from the high-pressure battery 18 through the DC-DC converter 20 or the power supplying thereto from the low-pressure battery 21.

The air conditioner for a vehicle in the present disclosure includes a heating device that is configured to perform a heating operation for heating a vehicle compartment. For example, the heating device may be a warm-water heating device 22 using the heat of the cooling water of the engine 11. The warm-water heating device 22 includes a cooling water circuit 23 that is configured to be connected to a cooling path (i.e., a water jacket) of the engine 11 and that allows the cooling water therethrough in the heating operation. The cooling water circuit 23 mounts an electric water pump 24 and a heater core 25 for the heating operation. A heater which serves as a heat source, other than the engine 11, heating the cooling water other than the engine 11 is connected to the cooling water circuit 23. In the first embodiment, the heater may include a heat pump 26 and an exhaust-heat recovery device 44. The heat pump 26 is located downstream of the engine 11. The heater core 25 is located downstream of the heat pump 26.

The electric water pump 24 is operated by the power from the low-pressure battery 21. The electric water pump 24 is configured to circulate the cooling water in the cooling water circuit 23. The cooling water is allowed to flow through the engine 11, the heat pump 26, and the heater core 25 in this order, and then returns to the engine 11 from the heater core 25.

The heat pump 26 includes an electric compressor 27, a heater 28, an expansion valve 29, and an exterior heat exchanger 30. The compressor 27 compresses gas refrigerant having a low temperature and a low pressure to be gas refrigerant having a high temperature and a high pressure. The heater 28 allows the gas refrigerant having the high temperature and the high pressure to dissipate heat and to be liquid refrigerant having a high-pressure. The expansion valve 29 reduces a pressure of the liquid refrigerant having the high pressure and expands the liquid refrigerant to be liquid refrigerant having a low temperature and a low pressure. The exterior heat exchanger 30 allows the liquid refrigerant having the low temperature and low pressure to absorb heat and to be the gas refrigerant having the low temperature and the low pressure.

The heater 28 of the heat pump 26 allows the refrigerant and the cooling water to exchange heat with each other therein and is configured to heat the cooling water using the heat of the refrigerant. On the other hand, the heater core 25 allows the cooling water and the air to exchange heat with each other therein and is configured to heat the air using the heat of the cooling water. A blower fan 32, which is configured to blow warm air, is disposed near the heater core 25.

Figure 2:
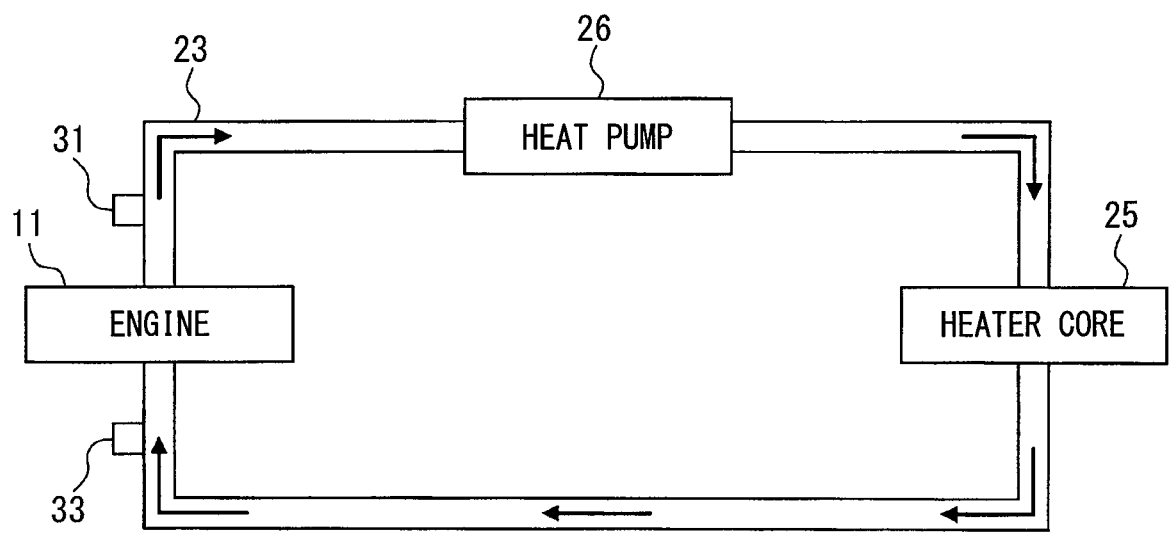
FIG. 2 is a diagram showing a schematic configuration of a cooling water circuit in a heating operation in the first embodiment.

As shown in FIG. 2, the cooling water circuit 23 mounts a engine-outlet temperature sensor 31 that is configured to detect a temperature (i.e., an engine-outlet water temperature) of the cooling water flowing out of the engine 11. The engine-outlet temperature sensor 31 is located upstream of the engine 11 near an inlet of the engine 11 from which the cooling water flows into the engine 11. The cooling water circuit 23 mounts an engine-outlet temperature sensor 31 that is configured to detect a temperature (i.e., an engine-outlet water temperature) of the cooling water flowing out of the engine 11. The engine-outlet temperature sensor 31 is located downstream of the engine 11 near an outlet of the engine 11 form which the cooling water flows out of the engine 11.

As shown in FIG. 1, an accelerator sensor 34 is configured to detect an opening degree of a gas pedal, i.e., an operation degree of the gas pedal. A shift switch 35 is configured to detect a location of a shift lever. A brake switch 36 is configured to detect an operation of the brake. Alternatively, a brake sensor may be disposed to detect the operation amount of the brake. A speed sensor 37 is configured to detect a speed of the vehicle. An acceleration sensor 38 is configured to detect a degree of the acceleration.

A hybrid ECU 39 is mounted as a controller that is configured to control the vehicle as a whole. Specifically, the hybrid ECU 39 is configured to read output signals from the above-described various sensors and switches and to determine an operation state of the vehicle based on the output signals. The hybrid ECU 39 is configured to send and receive control signals and data signals between the hybrid ECU 39 and an engine ECU 40 and between the hybrid ECU 39 and an air conditioning ECU 42. The output signals from the engine-inlet temperature sensor 33 and the engine-outlet temperature sensor 31 are input to the hybrid ECU 39. The sensors 31 and 33 may be connected to the hybrid ECU 39 directly using a wire or may be in communication with the hybrid ECU 39 via CAN (Controller Area Network).

The engine ECU 40 is a controller that is configured to control an operation of the engine 11. MG-ECU 41 is a controller that is configured to control the inverter 19 to control the MG 12 and to control the generator 17 and the DC-DC converter 20. For example, the air conditioning ECU 42 is configured to control the electric water pump 24, the electric compressor 27, and the blower fan 32 included in the warm-water heating device 22.

The hybrid ECU 39 is configured to send the control signals and the data signals to the ECUs 40, 41, 42 and receives the control signals and the data signals from the ECUs 40, 41, 42. Thus, the hybrid ECU 39 is configured to control the engine 11, the MG12, the generator 17, the DC-DC converter 20, and the warm-water heating device 22 based on the operation state of the vehicle. In addition, the hybrid ECU 39 is also configured to send the control signals and the data signals to a power-source ECU 43 and receives the controls signals and the data signals from the power-source ECU 43. The power-source ECU 43 is configured to monitor the high-pressure battery 18.

The hybrid ECU 39 is configured to switch driving modes, for example, may be among an engine mode, an assist mode, and an EV mode. In the engine mode, the vehicle moves by operating the wheels 16 using only the power from the engine 11. In the assist mode, the vehicle moves by operating the wheels 16 using both of the power from the engine 11 and the power from the MG 12. In the EV mode, the vehicle moves by operating the wheels 16 using only the power from the MG 12. For example, the hybrid ECU 39 may allow the EV mode to be started when the temperature of the cooling water in the outlet of the engine 11 becomes a warm-up stoppable temperature, at which the engine 11 is allowed to be stopped, or higher.

The hybrid ECU 39 is configured to set the driving mode to a power regeneration mode when braking the vehicle. For example, the braking the vehicle is performed when generating braking torque while the gas pedal is not operated or the braking pedal is operated. In the power regeneration mode, the power from the wheels 16 operates the MG 12 such that the MG 12 converts the kinetic energy of the vehicle into the electric energy to generate the regenerated power. The regenerated power, i.e., the regenerated electric power, is stored in the high-pressure battery 18. As a result, time durations in which the assist mode and the EV mode are operated can be longer, and therefore the fuel consumption can be improved.

The cooling water heating amount of the engine 11 increases in proportion to the output of the engine 11, however it is not determined only by the output of the engine 11. This is because the cooling water heating amount of the engine 11 also fluctuates due to other factors such as the temperature in the engine room, the rotational speed of the electric fan, the vehicle speed, and the like. The cooling water heating amount of the engine 11 is, i.e., an amount of heat transferring from the engine 11 to the cooling water.

In the first embodiment, the cooling water heating amount of the engine 11 is determined based on the engine-outlet water temperature detected by the engine-outlet temperature sensor 31 and the engine-inlet water temperature detected by the engine-inlet temperature sensor 33. Specifically, the hybrid ECU 39 operates the heating control routine shown in FIG. 3 to adjust the output (i.e., the cooling water heating amount) of the heat pump 26 based on an engine temperature difference between the engine-outlet water temperature and the engine-inlet water temperature. The engine temperature difference may be referred to as an engine inlet-outlet water temperature difference. Since the engine temperature difference varies depending on the cooling water heating amount of the engine 11, the engine temperature difference accurately reflects the cooling water heating amount of the engine 11. Therefore, by adjusting the output of the heat pump 26 according to the engine temperature difference, it is possible to adjust the output of the heat pump 26 according to the cooling water heating amount of the engine 11.

Specifically, the output of the heat pump 26 is decreased as the engine temperature difference rises. Thus, when the engine temperature difference is large and the cooling water heating amount of the engine 11 is large, the output of the heat pump 26 is reduced to suppress the output of the heat pump 26 from becoming larger excessively.

Figure 4:
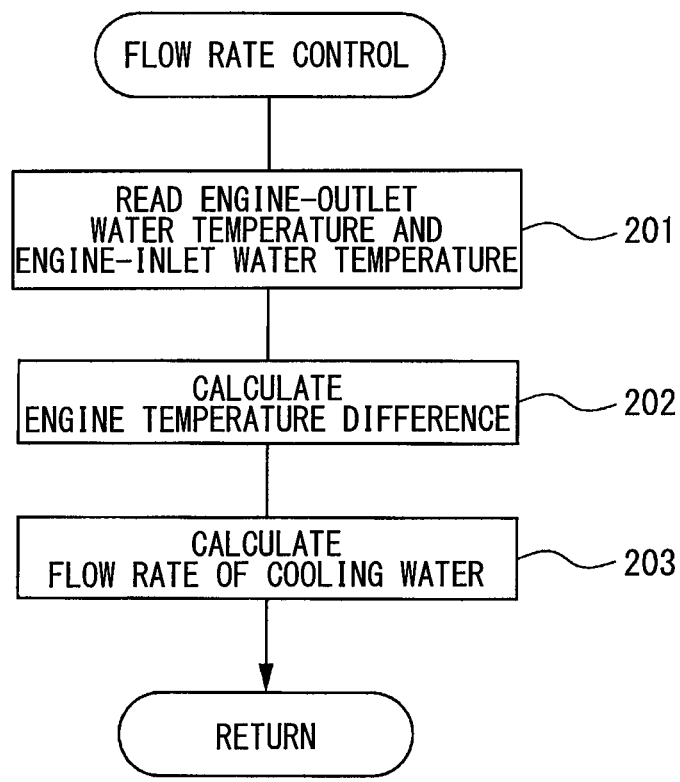
FIG. 4 is a flowchart showing a flow rate control routine.

In addition, the hybrid ECU 39 operates a heating control routine shown in FIG. 4 to adjust the flow rate (i.e., engine cooling-water flow rate) of the cooling water based on the engine temperature difference. The flow rate of the cooling water is, i.e., a volume of the cooling water flowing into the engine 11. Since the engine temperature difference accurately reflects the cooling water heating amount of the engine 11, the flow rate can be adjusted based on the cooling water heating amount of the engine 11 by adjusting the flow rate according to the engine temperature difference.

Specifically, the cooling water flow rate is reduced when the engine temperature difference is small. Thus, when the engine temperature difference is small and the cooling water heating amount of the engine 11 is small, the engine-inlet water temperature is decreased by decreasing the flow rate of the cooling water. As a result, the amount of heat transferring from the engine 11 to the cooling water increases, therefore the amount of heat dissipated from, e.g., the engine 11 and the cooling water piping is reduced.

The output of the heat pump 26 is increased when the engine temperature difference is small and the cooling water heating amount of the engine 11 is small.

However, in order to improve the fuel economy, the output of the heat pump 26 is preferably used by heating heat generated by the heater core 25. For example, it may be better to prevent the output of the heat pump 26 from being used as energy to increase a temperature of the cooling water. Specifically, exhaust heat from the engine 11 may be used to increase the temperature of the cooling water preferably. When reducing the flow rate of the cooling water, a heater-core outlet temperature, i.e., a temperature of the cooling water flowing out of the heater core 25, falls therefore the engine-inlet water temperature is prevented from increasing. The heating control routine shown in FIG. 3 and the flow rate control routine shown in FIG. 4, which are operated by the hybrid ECU 39, will be described hereafter.

(Heating Control Routine)

Figure 3:
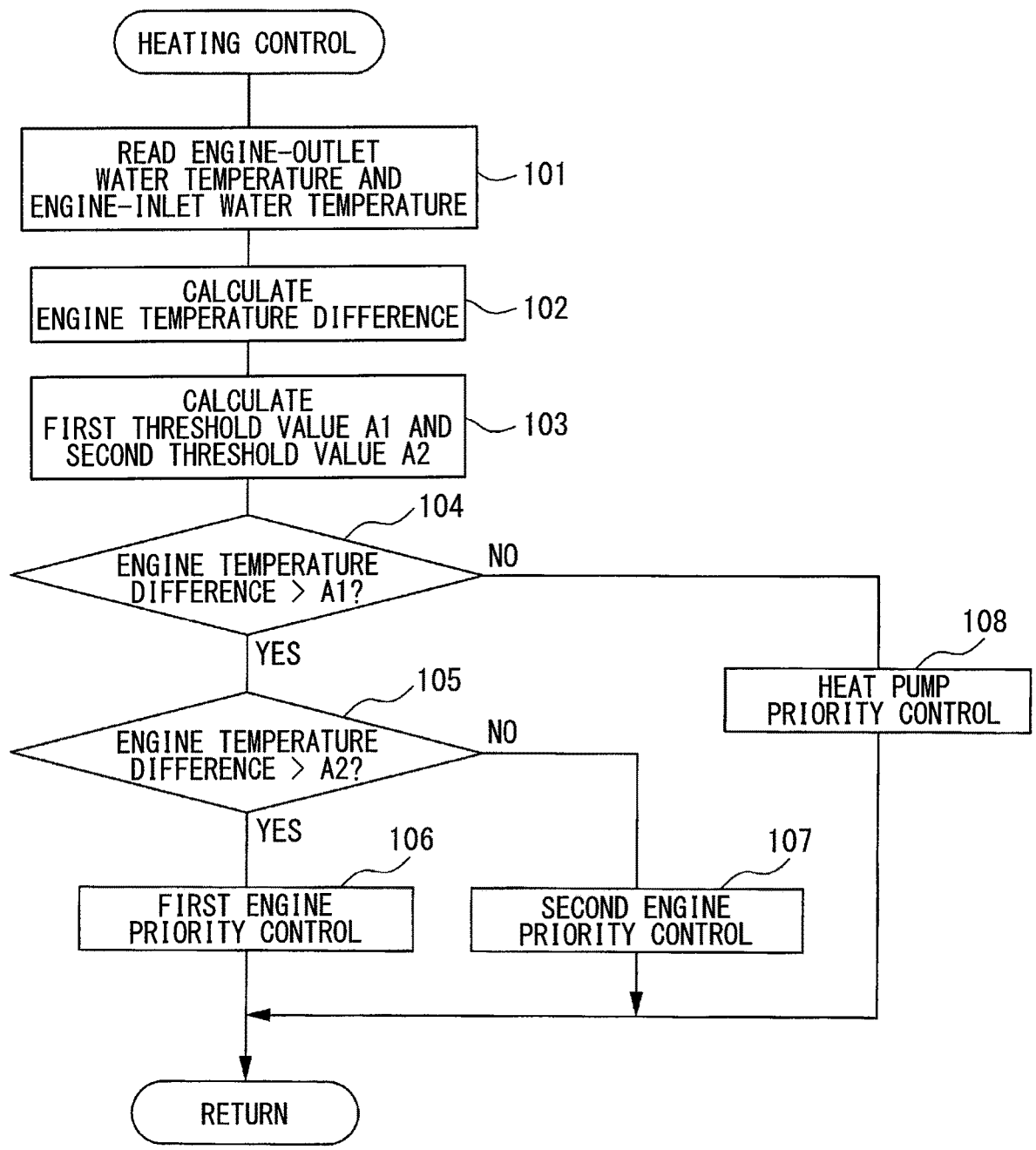
FIG. 3 is a flowchart showing a heating control routine in the first embodiment.

The heating control routine shown in FIG. 3 is repeatedly executed at specified intervals while the hybrid ECU 39 is on. The heating control routine serves as an output controller.

When this routine is started, the current engine-outlet water temperature detected by the engine-outlet temperature sensor 31 is acquired and the current engine-inlet water temperature detected by the engine-inlet temperature sensor 33 is acquired in section 101.

Subsequently, in section 102, a difference between the current engine-outlet water temperature and the engine-inlet water temperature before the predetermined time is obtained as the engine temperature difference.

(Engine Temperature Difference)=(Instant Engine-Outlet Water Temperature)−(Engine-Inlet Water Temperature Specified Time Ago)

For example, the specified time is a time duration required for the cooling water to move from a detecting position in the engine-inlet temperature sensor 33 to a detection position in the engine-outlet temperature sensor 31.

The heating control routine advances to section 103 from section 102. In section 103, a threshold value A1 and a threshold value A2 are calculated based on a traveling load (e.g., an accelerator opening degree) and a current engine-outlet water temperature by a map, an equation, or the like. The threshold value A2 is set to be larger than the threshold value A1 (i.e., A2>A1).

The heating control routine advances to section 104 from section 103. In section 104, it is determined whether the engine temperature difference is larger than the threshold value A1. The heating control routine advances to section 105 when the engine temperature difference is larger than the threshold value A1. In section 105, it is determined whether the engine temperature difference is larger than the threshold value A2.

When the engine temperature difference is determined to be greater than the threshold value A2 in section 105, it is determined that the cooling-water heating amount of the engine 11 is considerably large, and then the heating control routine advances to section 106. In section 106, a first engine priority control is performed. In the first engine priority control, the output of the heat pump 26 is set to be smaller than an output of the heat pump 26 in a second engine priority control described later. Accordingly, the output of the heat pump 26 when the engine temperature difference is greater than the threshold value A2 becomes smaller than the output of the heat pump 26 when the engine temperature difference is the threshold value A2 or smaller. In the first embodiment, the output of the heat pump 26 is stooped, i.e., the output of the heat pump 26 becomes zero.

On the other hand, when the engine temperature difference is determined to be the threshold value A2 or smaller, it is determined that the cooling-water heating amount of the engine 11 is considerably large, and then the heating control routine advances to section 107. When the engine temperature difference is the threshold value A2 or smaller, the engine temperature difference is larger than the threshold value A1 and smaller than or equal to the threshold value A2. In section 107, the second engine priority control is performed. In the second engine priority control, the output of the heat pump 26 is set to be smaller than an output of the heat pump 26 in a heat pump priority mode, which will be described later, and to be greater than the output of the heat pump 26 in the first engine priority mode. Thus, the output of the heat pump 26 when the engine temperature difference is greater than the threshold value A1 and smaller than or equal to the threshold value A2 becomes smaller than the output of the heat pump 26 when the engine temperature difference is the threshold value A1 or less and greater than the output of the heat pump 26 when the engine temperature difference is larger than the threshold value A2.

When the engine temperature difference is determined to be the threshold value A1 or less in section 104, it is determined that the cooling-water heating amount of the engine 11 is small, and then the heating control routine advances to section 108. In section 108, the heat pump priority control is performed. In the heat pump priority control, the output of the heat pump 26 is set to be greater than the output of the heat pump 26 in the second engine priority control. Accordingly, the output of the heat pump 26 when the engine temperature difference is the threshold value A1 or less becomes greater than the output of the heat pump 26 when the engine temperature difference is greater than the threshold value A1.

(Flow Rate Control Routine)

A flow rate control routine shown in FIG. 4 is performed repeatedly at specific intervals while the hybrid ECU 39 is on. The flow rate control routine may serve as a flow rate adjuster.

When the flow rate control routine starts, the engine-outlet water temperature and the engine-inlet water temperature in section 201. The engine-outlet water temperature is an instant temperature of the cooling water detected by the engine-outlet temperature sensor 31. The engine-inlet water temperature is an instant temperature of the cooling water detected by the engine-inlet temperature sensor 33.

Subsequently, the flow rate control routine advances to section 202. In section 202, an engine temperature difference, which is a difference between the instant engine-outlet water temperature and an engine-outlet water temperature a specified time period ago, is determined in the same manner as in the section 102 in FIG. 3.

Figure 5:
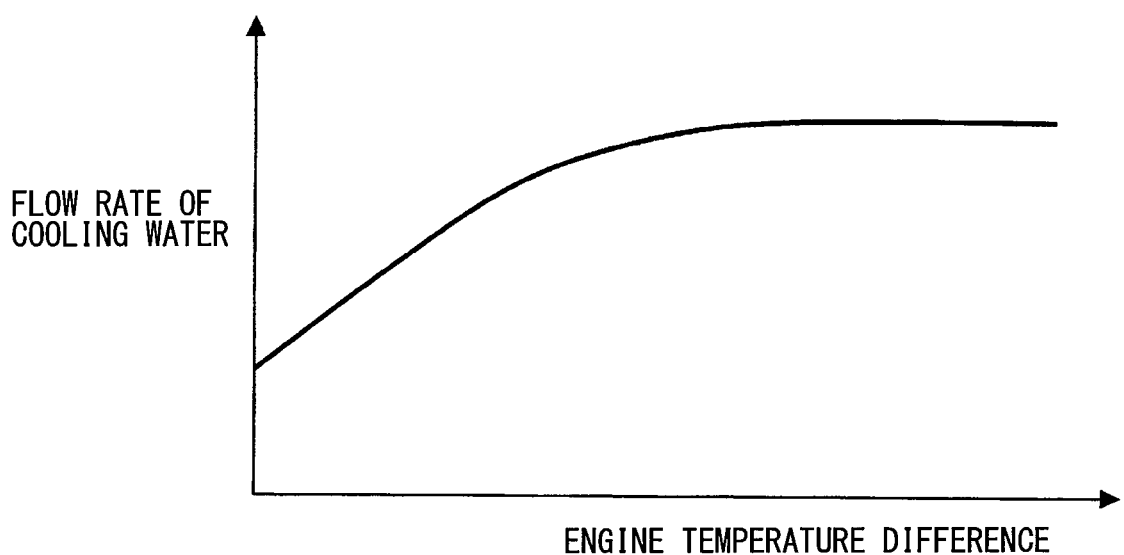
FIG. 5 is a schematic graph showing an example of a map of the flow rate of the cooling water.

The flow rate control routine advances to the section 203 from the section 202. In section 203, the hybrid ECU 39 calculates a flow rate of the cooling water based on the engine-outlet water temperature. As shown in FIG. 5, the map or the formula used to calculate the flow rate may be set such that the flow rate decreases as the engine temperature difference decreases. The hybrid ECU 39 controls the electric water pump 24 such that the flow rate of the cooling water becomes the flow rate calculated in section 203.

In the first embodiment, the output of the heat pump 26 is adjusted based on the engine temperature difference between the engine-outlet water temperature detected by the engine-outlet temperature sensor 31 and the engine-inlet water temperature detected by the engine-inlet temperature sensor 33. Since the engine temperature difference varies depending on the cooling-water heating amount of the engine 11, the engine temperature difference is information that accurately reflects the cooling water heating amount of the engine 11. Therefore, by adjusting the output of the heat pump 26 based on the engine temperature difference, it is possible to adjust the output of the heat pump 26 based on the cooling water heating amount of the engine 11.

The output of the heat pump 26 when the engine temperature difference is greater than the threshold value A1 is set to be smaller than the output of the heat pump 26 when the engine temperature difference is the threshold value A1 or less. The output of the heat pump 26 when the engine temperature difference is greater than the threshold value A2 is set to be smaller than the output of the heat pump 26 when the engine temperature difference is the threshold value A2 or less. For example, the output of the heat pump 26 may be stopped. Thus, when the engine temperature difference is large and the cooling-water heating amount of the engine 11 is large, the output of the heat pump 26 is decreased such that the output of the heat pump 26 can be prevented from being excessively large. As a result, it is possible to reduce the power consumption of the heat pump 26 by utilizing the waste heat of the engine 11, and therefore it is possible to improve the fuel consumption.

The output of the heat pump 26 when the engine temperature difference is the threshold value A1 or less is set to be greater than the output of the heat pump 26 when the engine temperature difference is larger than the threshold value A1. Accordingly, when the engine temperature difference is small and the cooling-water heating amount of the engine 11 is small, the output of the heat pump 26 can be increased to secure the target amount of heat to be used in the heating operation, and therefore comfort can be secured.

Figure 6:
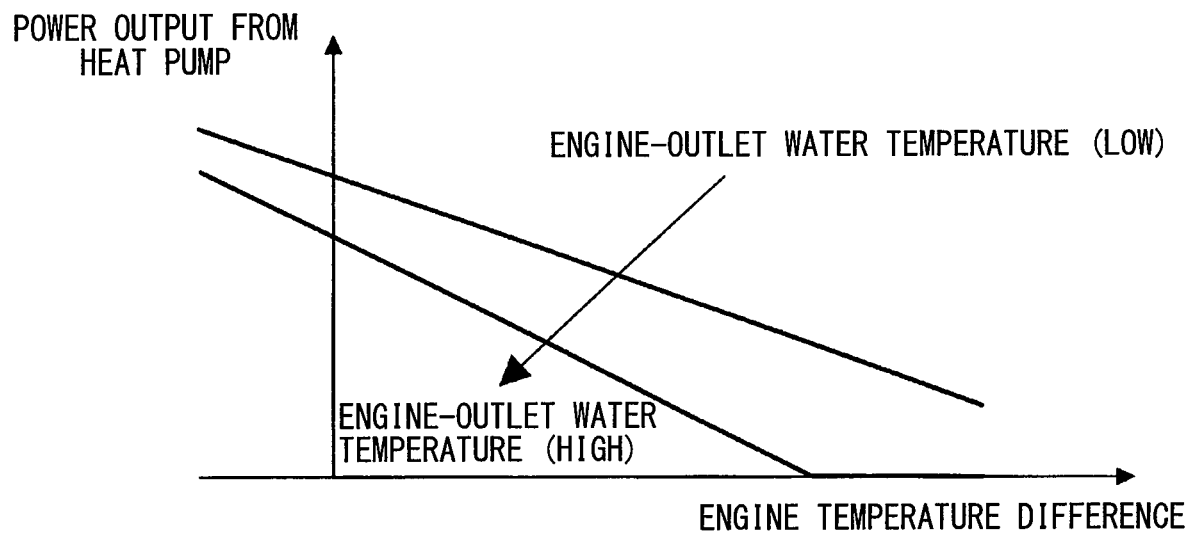
FIG. 6 is a diagram explaining how an output of a heat pump is set.

In the routine shown in FIG. 3, the output of the heat pump 26 is changed stepwise based on the engine temperature difference. However, the output of the heat pump 26 may be changed continuously based on the engine temperature difference as shown in FIG. 6. In this case, the output of the heat pump 26 may be increased as the engine temperature difference falls. Alternatively, the output of the heat pump 26*t* may be increased as the engine-outlet water temperature falls.

In the present embodiment, the hybrid ECU 39 adjusts the output of the heat pump 26 based on the engine temperature difference. Since the engine temperature difference accurately reflects the cooling-water heating amount of the engine 11, the flow rate of the cooling water can be adjusted depending on the cooling-water heating amount of the engine 11 by adjusting the flow rate of the cooling water based on the engine temperature difference.

For example, the flow rate of the cooling water may be set to be small when the engine temperature difference is small. Accordingly, when the engine temperature difference is small and the cooling-water heating amount of the engine 11 is small, the flow rate of the cooling water is reduced such that the engine-inlet water temperature falls. Accordingly, the amount of heat dissipated from the engine 11, e.g., through pipes that allow the cooling water to flow therethrough, can be reduced by increasing the amount of heat transferred from the engine 11 to the cooling water. Accordingly, it is possible to reduce a waste amount of heat and to improve fuel economy.

When the cooling water is heated while the output [kW] of the heat pump 26 is fixed, a rising value [K] of the cooling water decreases as the flow rate of the cooling water increases. The flow rate of the cooling water can be large when a difference between a target water temperature of the cooling water that is required to perform the heating operation and the instant engine-outlet water temperature. The target water temperature also can be referred to as a target temperature of the heater core inlet water temperature. The target temperature is, i.e., a temperature of the cooling water flowing into the heater core 25. The flow rate of the cooling water can be large when a difference between the target temperature and the instant engine-outlet water temperature is large. That is, the heating operation can be performed with high efficiency when the flow rate of the cooling water is large.

However, in a case where the difference between the target temperature of the cooling water flowing into the heater core 25 and the instant engine-outlet water temperature is large, it is necessary to increase the engine-outlet water temperature when the flow rate of the cooling water is not reduced. When a temperature of the cooling water is increased, an amount of heat dissipated from the cooling water may increase, and an amount of heat transferred from the engine 11 to the cooling water may be caused to decrease. Accordingly, when considering the fuel consumption, the temperature of the cooling water is prevented from being increased in the heat pump 26 preferably. When the temperature of the cooling water rises due to the heat (available without cost) from the engine 11 while the vehicle is moving, the increase of the temperature has almost no harmful effect on the fuel consumption. When the engine temperature difference is large, it means that the cooling-water heating amount of the engine 11 is large. The temperature of the cooling water rises as the heat available without cost increases. Accordingly, priority is given to comfort and the flow rate of the cooling water is not reduced.

In contrast, when the engine temperature difference is small, the temperature of the cooling water is increased by using the heat pump 26 mainly. Accordingly, priority is given to the fuel consumption and the flow rate of the cooling water is reduced such that the heat pump 26 is prevented from being used to increase the temperature of the cooling water.

Here, the flow rate of the cooling water flowing through the engine 11 and the flow rate of the cooling water flowing through the heater core 25 can be set to different values, for example, by providing a bypass passage that allows the cooling water to bypass the engine 11. In this situation, the amount of heat dissipated from the engine 11 and the amount of heat transferred to the engine 11 can be prevented from being reduced by reducing the flow rate of the cooling water even when the temperature of the cooling water flowing into the heater core 25 is increased by using the heat pump 26.

Figure 7:
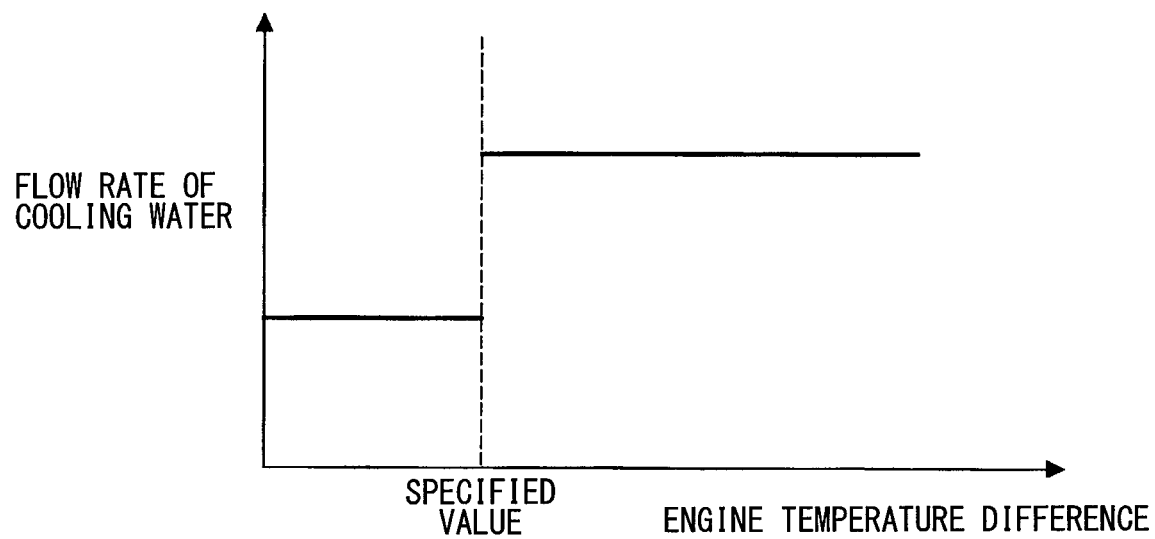
FIG. 7 is a diagram explaining how the flow rate of the cooling water is set.

In the flow rate control routine shown in FIG. 4 changes the flow rate of the cooling water continuously based on the engine temperature difference. However, the flow rate of the cooling water may be varied stepwise based on the engine temperature difference as shown in FIG. 7. For example, the flow rate of the cooling water when the engine temperature difference is smaller than a specified value may be reduced to be smaller than the flow rate of the cooling water when the engine temperature difference is the specified value or greater.

When the engine temperature difference is a negative value, flow rate of the cooling water may be reduced to 0 or a value close to 0 so as to reduce an amount of heat escaping from the engine 11. When the engine temperature difference is a negative value, it means that the engine-outlet water temperature is lower than the engine-inlet water temperature. In this case, the bypass passage that allows the cooling water to flow while bypassing the engine 11 may be mounted.

Here, the cooling-water heating amount of the engine 11 may be estimated based on the engine-outlet water temperature detected by the engine-outlet temperature sensor 31. However, it is necessary to consider not only the specifications of the engine 11 such as the exhaust amount of the engine 11, the front exhaust and the rear exhaust, but also various factors such as the air flow in the engine room. Therefore, adapting the calculation model, i.e., adapting the parameters of the model for estimating the cooling-water heating amount is required for each vehicle or engine, which may increase the number of adaptation steps.

Then, in the first embodiment, the engine temperature difference, which is calculated using the temperature sensors 31 and 33, is used as information relating to the cooling-water heating amount of the engine 11. As a result, the above-described adaptation can be omitted, and therefore the number of adaptation steps can be reduced. In addition, the development efficiency of the vehicle is improved and the part number of the ECU can be reduced.

In the first embodiment, the hybrid ECU 39 includes functions performing the first engine priority control, the second engine priority control, and the heat pump priority control. However, the hybrid ECU 39 may include one or two of the three functions. In addition, it may be possible to omit a function that adjusts the flow rate of the cooling water based on the engine temperature difference.

Second Embodiment

Figure 9:
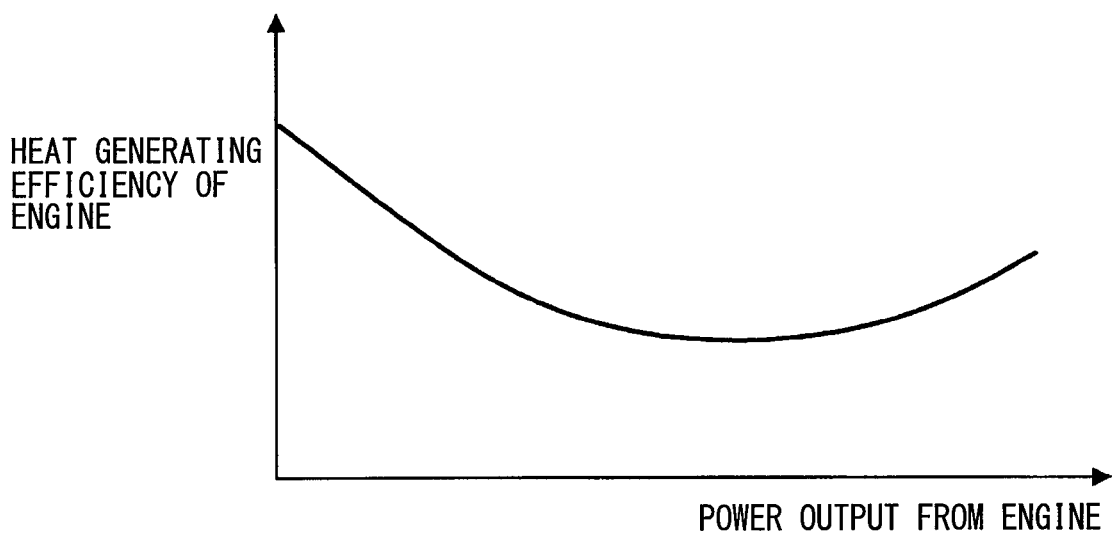
FIG. 9 is a graph showing an example for a property of heat generating efficiency of an engine.
Figure 10:
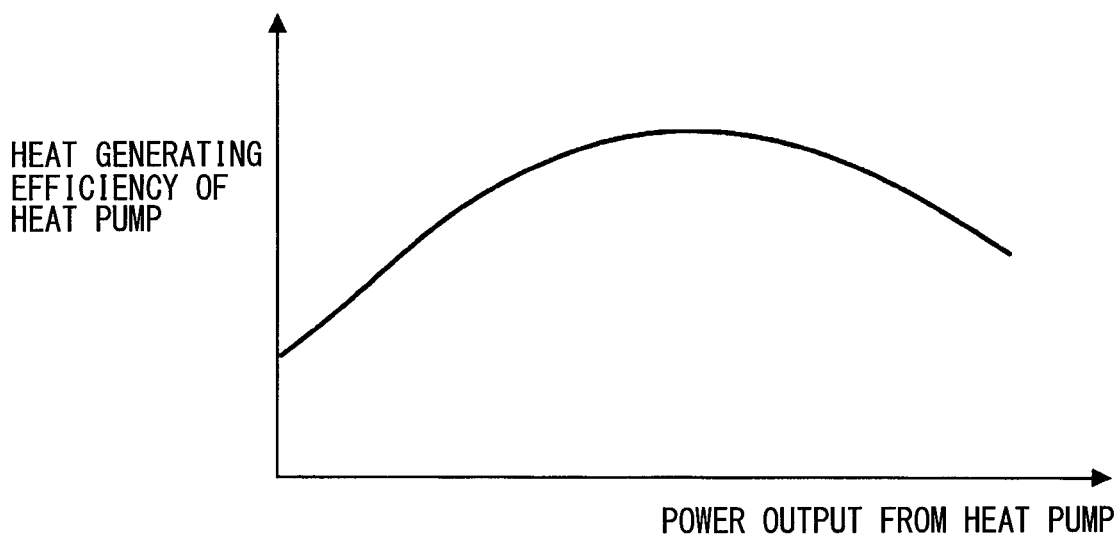
FIG. 10 is a graph showing an example for a property of heat generating efficiency of the heat pump.

A second embodiment will be described hereafter referring to FIG. 8 to FIG. 10. In the second embodiment, parts different from the first embodiment will be described mainly.

Figure 8:
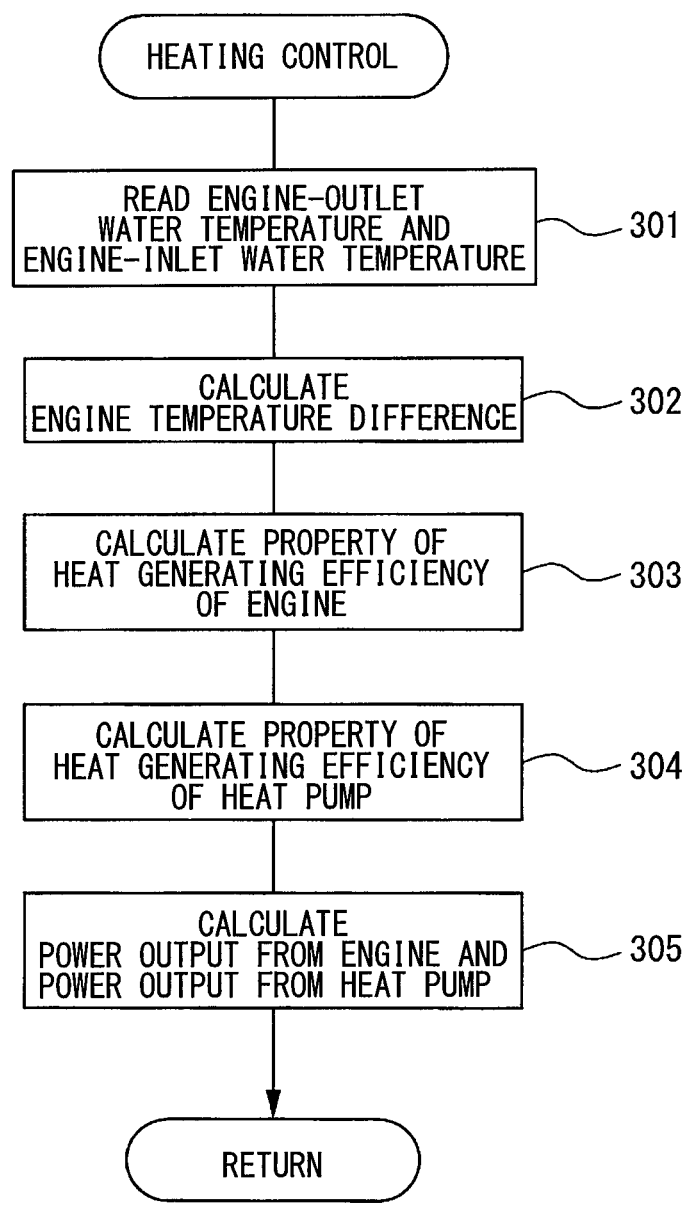
FIG. 8 is a flowchart showing a heating control routine in a second embodiment.

In the second embodiment, the hybrid ECU 39 operates a heating control routine shown in FIG. 8 to set the outputs of the engine 11 and the heat pump 26 based on the engine temperature difference. A property of heat generating efficiency of the engine 11 is calculated based on the engine temperature difference. The property of heat generating efficiency of the engine 11 is, i.e., a ratio of the cooling-water heating amount to an amount of fuel consumed by the engine 11. A property of heat generating efficiency of the heat pump 26 is calculated based on the engine-outlet water temperature. The property of heat generating efficiency of the heat pump 26 is, i.e., a ratio of the cooling-water heating amount to an amount of energy consumed by the heat pump 26. Based on the properties of the heat generating efficiency of the engine 11 and the heat pump 26, the outputs of the engine 11 and the heat pump 26 are calculated such that the heat generating efficiency of the combination of the heat generating efficiency of the engine 11 and the heat generating efficiency of the heat pump 26 becomes the highest under the condition that the target heating heat amount can be secured.

The heating control routine, which is performed by the hybrid ECU 39 in the second embodiment, shown in FIG. 8 will be described in detail hereinafter. The heating control routine shown in FIG. 8 may serve as the output controller.

In the heating control routine shown in FIG. 8, the hybrid ECU 39 reads the instant engine-outlet water temperature, which is detected by the engine-outlet temperature sensor 31, and the instant engine-inlet water temperature, which is detected by the engine-inlet temperature sensor 33, in section 301.

The heating control routine advances to section 302 from section 301. In section 302, the engine temperature difference is determined in the same manner as in section 102 in FIG. 3. The engine temperature difference is a difference between the instant engine-outlet water temperature and the engine-inlet water temperature the specified time ago.

The heating control routine advances to section 303 from section 302. In section 303, the instant property of the heat generating efficiency of the engine 11 is calculated based on the instant engine temperature difference, the flow rate of the cooling water, and the amount of consumed fuel. As the property of the heat generating efficiency of the engine 11, a relationship between the output of the engine 11 and the heat generating efficiency of the engine 11 is determined as shown in FIG. 9. In FIG. 9, when the output of the engine is zero (i.e., the output of the engine 11=0), it means that the engine is not stopped but idling is being performed. The property of the heat generating efficiency of the engine 11 based on the engine temperature difference, the flow rate of the cooling water, and the fuel consumption amount may be stored in the ROM or the like of the hybrid ECU 39 in advance.

The heating control routine advances to section 304 from section 303. In section 304, the instant property of the heat generating efficiency of the heat pump 26 is calculated based on the instant engine-outlet water temperature and an outside temperature. As the property of the heat generating efficiency of the heat pump 26, a relationship between the output of the heat pump 26 and the heat generating efficiency of the heat pump 26 is determined as shown in FIG. 10. Here, the output of the heat pump 26 varies depending on a rotational speed of the electric compressor 27. The property of the heat generating efficiency of the heat pump 26 based on the engine-outlet water temperature and the outside temperature may be stored in the ROM or the like of the hybrid ECU 39 in advance.

The heating control routine advances to section 305 from section 304. In section 305, based on the properties of the heat generating efficiency of the engine 11 and the heat pump 26, the outputs of the engine 11 and the heat pump 26 are calculated such that the heat generating efficiency of the combination of the heat generating efficiency of the engine 11 and the heat generating efficiency of the heat pump 26 becomes the highest under the condition that the target heating heat amount can be secured.

For example, the efficiency obtained by multiplying the heat generating efficiency Ke of the engine 11 by the heat generating efficiency Kh of the heat pump 26 is defined as the total heat generating efficiency K. The total heat generating efficiency K is calculated by using the following formula.

(Total Heat generating efficiency $K$)=(Heat generating efficiency $Ke$ of Engine 11)×(Heat generating efficiency $Kh$ of Heat Pump 26)

The cooling-water heating amount of the engine 11 and the output (i.e., the cooling-water heating amount) of the heat pump 26 are required to satisfy the following formula (F) to secure the target heating heat amount.

(Target Heating Heat Amount=(Cooling-Water Heating Amount Of Engine 11)+(Output Of Heat Pump 26)  (F)

A combination of the output of the engine 11 and the output of the heat pump 26, which makes the total heat generating efficiency K highest, is determined by using the instant properties of heat generating efficiency of the engine 11 and the heat pump 26. The combination of the outputs of the engine 11 and the heat pump 26 is selected from combinations that satisfy the above formula (F). Accordingly, the outputs of the engine 11 and the heat pump 26, which make the total heat generating efficiency K highest under the condition that the target heating heat amount can be secured.

In the second embodiment, the property of the heat generating efficiency of the engine 11 is calculated based on the engine temperature difference and the property of the heat generating efficiency of the heat pump 26 is calculated based on the engine-outlet water temperature. Based on the properties of the heat generating efficiency of the engine 11 and the heat pump 26, the outputs of the engine 11 and the heat pump 26 are calculated such that the total heat generating efficiency K becomes the highest under the condition that the target heating heat amount can be secured. As a result, the total heat generating efficiency K can be increased by coordinating the engine 11 and the heat pump 26, and fuel economy can be effectively improved.

The flow rate of the cooling water may be adjusted based on the engine temperature difference in the second embodiment.

The outputs and the engine 11 and the heat pump 26 may be set in various manner based on the engine temperature difference. For example, the output of the engine 11, i.e., an amount of power generated by the generator 17, may be increased and the output of the heat pump 26 may be decreased when the engine temperature difference is a specified value or greater. Alternatively, the output of the engine 11, i.e., the amount of power generated by the generator 17, may be decreased and the output of the heat pump 26 may be increased when the engine temperature difference is the specified value or less.

In the first and second embodiments, the output of the heat pump 26 and the flow rate of the cooling water are adjusted based on the engine temperature difference. However, the cooling-water heating amount of the engine 11 may be calculated based on the engine temperature difference and the output of the heat pump 26 and the flow rate of the cooling water may be adjusted based on the cooling-water heating amount of the engine 11. Alternatively, the output of the heat pump 26 may be estimated based on the engine-outlet water temperature detected by the engine-outlet temperature sensor 31 and the engine-inlet water temperature detected by the engine-inlet temperature sensor 33.

In the first and second embodiments, a water temperature sensor may be mounted, instead of the engine-inlet temperature sensor 33, around an outlet of the heater core 25 on a downstream side of the heater core 25 (i.e., upstream side of the engine 11). Alternatively, a water temperature sensor may be mounted, instead of the engine-outlet temperature sensor 31, around an inlet of the heat pump 26 on an upstream side of the heat pump 26 (i.e., downstream side of the engine 11).

Third Embodiment

A third embodiment will be described hereafter referring to FIG. 11. In the third embodiment, parts different from the first and second embodiments will be described.

Figure 11:
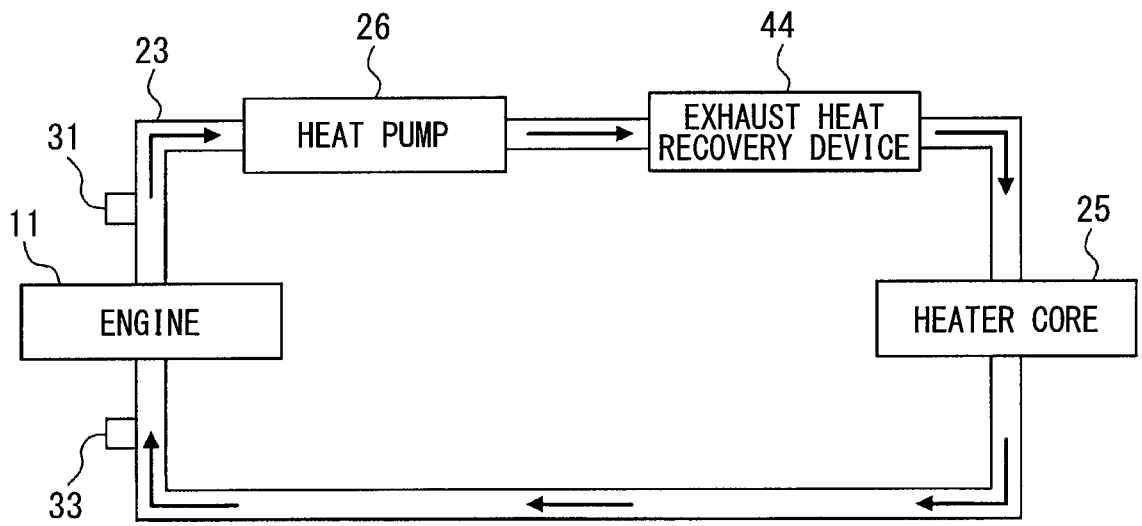
FIG. 11 is a diagram showing a schematic configuration of a cooling water circuit in a heating operation in a third embodiment.

In the third embodiment, the heater may include the heat pump 26 and the exhaust-heat recovery device 44 as shown in FIG. 11. The exhaust-heat recovery device 44 is located downstream of the heat pump 26. The exhaust-heat recovery device 44 allows exhaust gas from the engine 11 and the cooling water to exchange heat with each other therein and is configured to heat the cooling water using the heat of the exhaust gas. The engine-inlet temperature sensor 33 is located upstream of the engine 11 and the engine-outlet temperature sensor 31 is located downstream of the engine 11.

The engine temperature difference is calculated in the third embodiment. The engine temperature difference is the difference between the engine-outlet water temperature detected by the engine-outlet temperature sensor 31 and the engine-inlet water temperature detected by the engine-inlet temperature sensor 33. Thus, the output of the heat pump 26 is adjusted based on the engine temperature difference.

The outputs of the engine 11 and the heat pump 26 may be adjusted based on the engine temperature difference. The flow rate of the cooling water may be adjusted based on the engine temperature difference as well. The cooling-water heating amounts of the heat pump 26 and the exhaust-heat recovery device 44 may be estimated based on factors such as the outputs of the temperature sensors 31 and 33.

Fourth Embodiment

A fourth embodiment will be described hereafter referring to FIG. 12. In the fourth embodiment, parts different from the third embodiment will be described.

Figure 12:
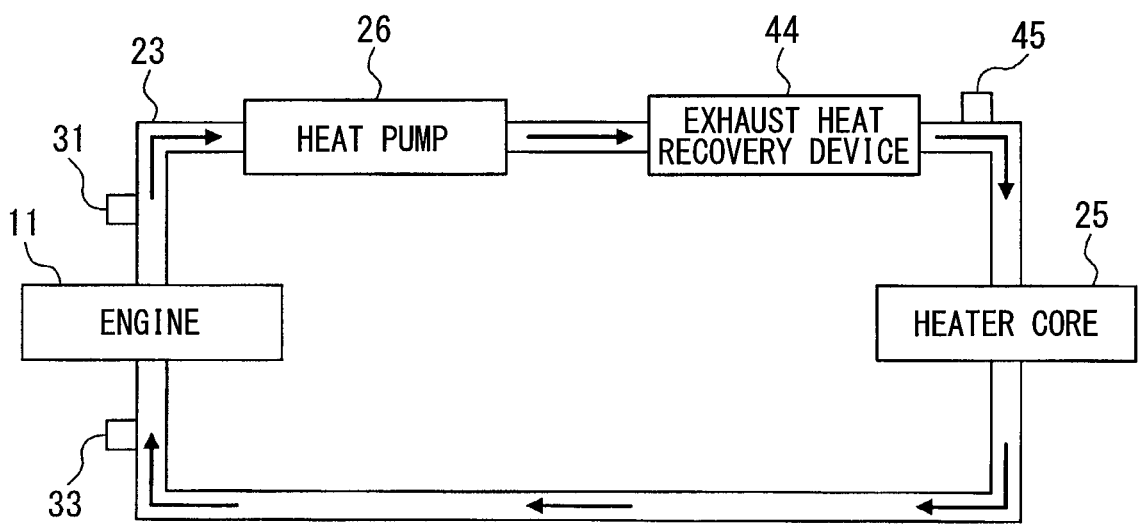
FIG. 12 is a diagram showing a schematic configuration of a cooling water circuit in a heating operation in a fourth embodiment.

In the fourth embodiment, the engine-inlet temperature sensor 33 is located upstream of the engine 11 and the engine-outlet temperature sensor 31 is located downstream of the engine 11 as shown in FIG. 12. In addition, an EHR-outlet temperature sensor 45 is positioned around an outlet of the exhaust-heat recovery device 44 on a downstream side of the exhaust-heat recovery device 44. The EHR-outlet temperature sensor 45 is configured to detect an EHR-outlet water temperature which is a temperature of the cooling water flowing out of the exhaust-heat recovery device 44.

In the fourth embodiment, the engine temperature difference and a water temperature difference A such that the output of the heat pump 26 is adjusted based on the engine temperature difference and the water temperature difference A.

The engine temperature difference is the difference between the engine-outlet water temperature detected by the engine-outlet temperature sensor and the engine-inlet water temperature detected by the engine-inlet temperature sensor 33. The water temperature difference A is a difference between the EHR-outlet water temperature detected by the EHR-outlet temperature sensor 45 and the engine-outlet water temperature detected by the engine-outlet temperature sensor 31. The water temperature difference A is information that reflects the cooling-water heating amounts of the heat pump 26 and the exhaust-heat recovery device 44 with high accuracy.

The outputs of the engine 11 and the heat pump 26 may be adjusted based on the engine temperature difference and the water temperature difference A. The flow rate of the cooling water may be adjusted based on the engine temperature difference and the water temperature difference A as well. The cooling-water heating amount of the exhaust-heat recovery device 44 may be estimated based on factors such as outputs of the temperature sensors 31, 33, and 45.

Fifth Embodiment

A fifth embodiment will be described hereafter referring to FIG. 13. In the fifth embodiment, parts different from the third embodiment will be described.

Figure 13:
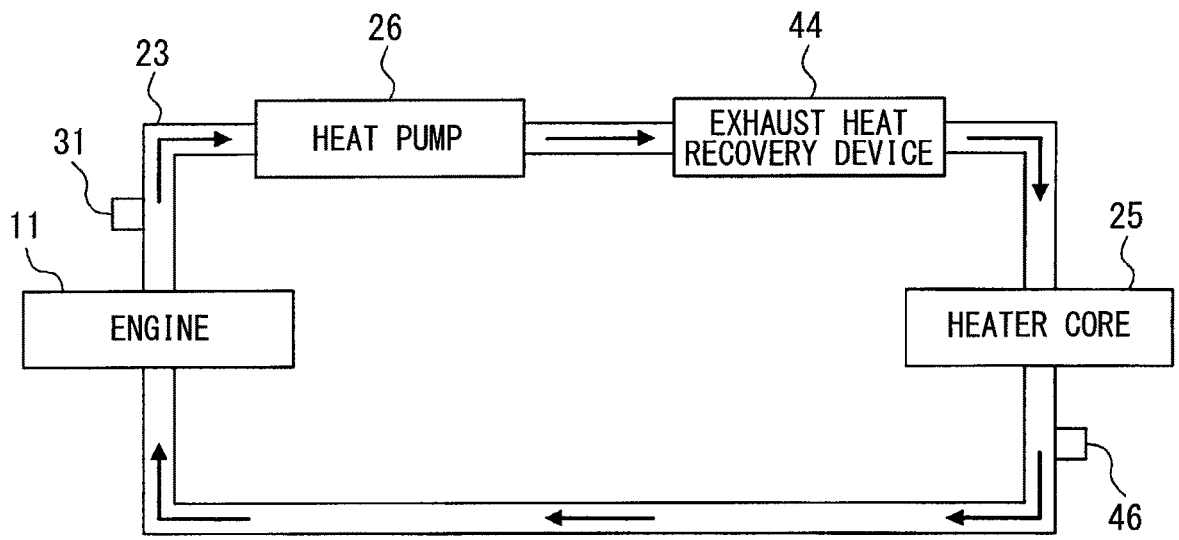
FIG. 13 is a diagram showing a schematic configuration of a cooling water circuit in a heating operation in a fifth embodiment.

As shown in FIG. 13, the engine-outlet temperature sensor 31 is located downstream of the engine 11 in the fifth embodiment. In addition, an HC-outlet temperature sensor 46 is positioned around the outlet of the heater core 25 on a downstream side of the heater core 25 (i.e., upstream side of the engine 11). The HC-outlet temperature sensor 46 is configured to detect an HC-outlet water temperature which is a temperature of the cooling water flowing out of the heater core 25.

In the fifth embodiment, a water temperature difference B is determined such that the output of the heat pump 26 is adjusted based on the water temperature difference B.

The water temperature difference B is a difference between the engine-outlet water temperature detected by the engine-outlet temperature sensor 31 and the HC-outlet water temperature detected by the HC-outlet temperature sensor 46. The water temperature difference B is information that reflects the cooling-water heating amount of the engine 11 with high accuracy.

The outputs of the engine 11 and the heat pump 26 may be adjusted based on the water temperature difference B. The flow rate of the cooling water may be adjusted based on the water temperature difference B as well. The engine-inlet water temperature and the cooling-water heating amounts of the heat pump 26 and the exhaust-heat recovery device 44 may be estimated based on factors such as the outputs of the temperature sensors 31 and 46.

Sixth Embodiment

A sixth embodiment will be described hereafter referring to FIG. 14. In the sixth embodiment, parts different from the third and fifth embodiments will be described.

Figure 14:
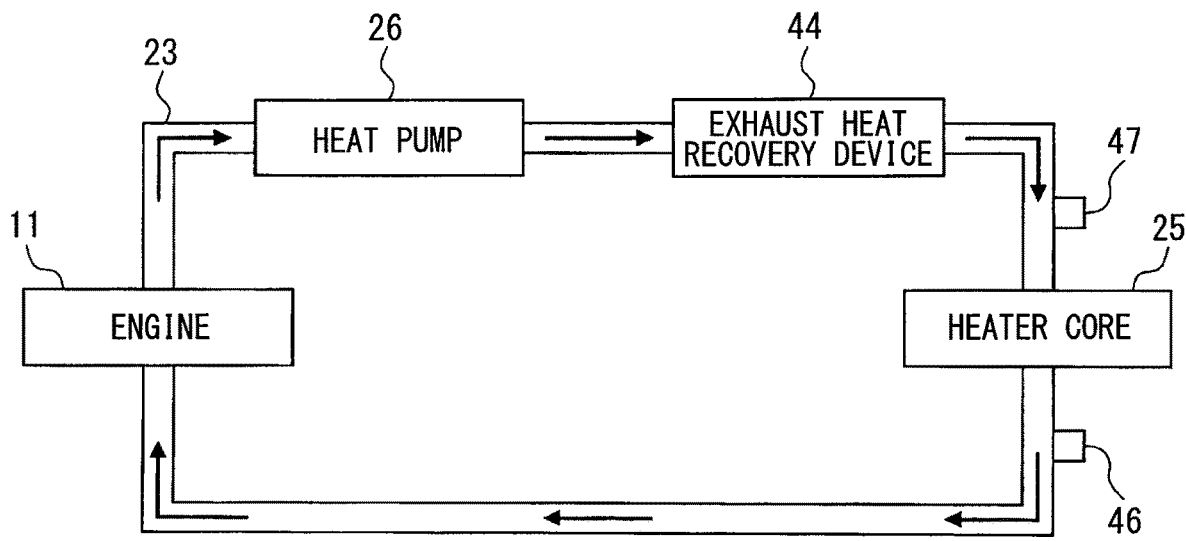
FIG. 14 is a diagram showing a schematic configuration of a cooling water circuit in a heating operation in a sixth embodiment.

In the sixth embodiment, an HC-inlet temperature sensor 47 is positioned around the inlet of the heater core 25 on the upstream side of the heater core 25 as shown in FIG. 14. The HC-inlet temperature sensor 47 is configured to detect an HC-inlet water temperature which is a temperature of the cooling water flowing into the heater core 25. In addition, the HC-outlet temperature sensor 46 is positioned downstream of the heater core 25.

In the sixth embodiment, a water temperature difference C is determined such that the output of the heat pump 26 is adjusted based on the water temperature difference C.

The water temperature difference C is a difference between the HC-outlet water temperature detected by the HC-outlet temperature sensor 46 and the HC-inlet water temperature detected by the HC-inlet temperature sensor 47. The water temperature difference C is information that reflects an amount of heat dissipated from the heater core 25 to the cooling water with high accuracy.

The outputs of the engine 11 and the heat pump 26 may be adjusted based on the engine temperature difference and the water temperature difference C. The flow rate of the cooling water may be adjusted based on the water temperature difference C as well. The engine-inlet water temperature and the cooling-water heating amounts of the heat pump 26 and the exhaust-heat recovery device 44 may be estimated based on factors such as the outputs of the temperature sensors 46 and 47.

Seventh Embodiment

A seventh embodiment will be described hereafter referring to FIG. 15. In the seventh embodiment, parts different from the third and fourth embodiments will be described.

Figure 15:
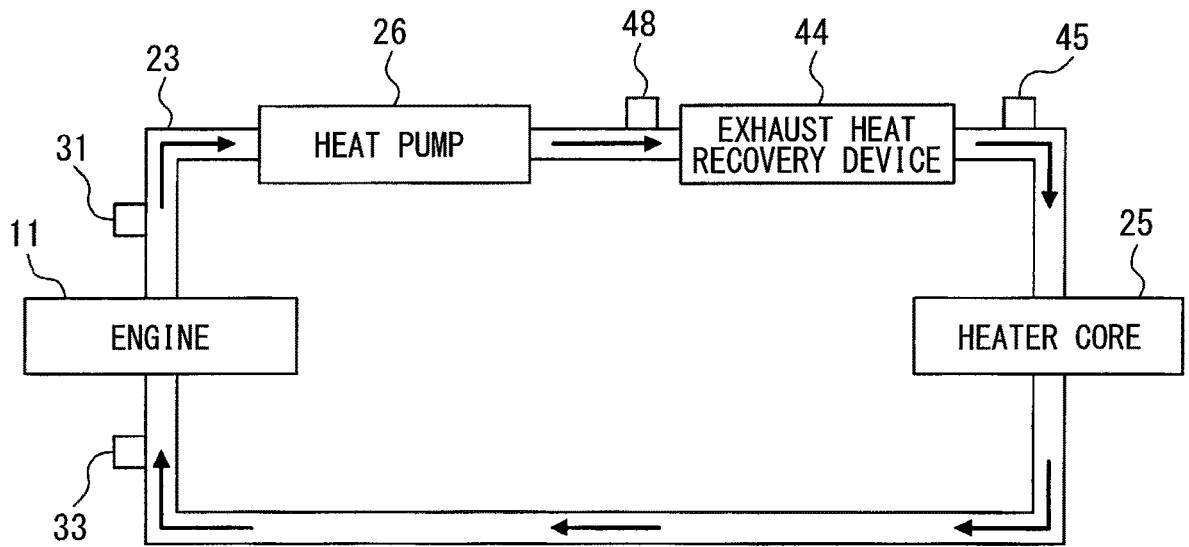
FIG. 15 is a diagram showing a schematic configuration of a cooling water circuit in a heating operation in a seventh embodiment.

In the seventh embodiment, the engine-inlet temperature sensor 33 is located upstream of the engine 11 and the engine-outlet temperature sensor 31 is located downstream of the engine 11 as shown in FIG. 15. In addition, an EHR-inlet temperature sensor 48 is positioned around an inlet of the exhaust-heat recovery device 44 on an upstream side of the exhaust-heat recovery device 44. The EHR-inlet temperature sensor 48 is configured to detect an EHR-inlet water temperature which is a temperature of the cooling water flowing into the exhaust-heat recovery device 44. The EHR-outlet temperature sensor 45 is positioned downstream of the exhaust-heat recovery device 44.

In the seventh embodiment, the engine temperature difference, a water temperature difference D, a water temperature difference E, and a water temperature difference F are determined such that the output of the heat pump 26 is adjusted based on the engine temperature difference and the water temperature differences D, E and F.

The engine temperature difference is the difference between the engine-outlet water temperature detected by the engine-outlet temperature sensor and the engine-inlet water temperature detected by the engine-inlet temperature sensor 33. The water temperature difference D is a difference between the EHR-inlet water temperature detected by the EHR-inlet temperature sensor 48 and the engine-outlet water temperature detected by the engine-outlet temperature sensor 31. The water temperature difference D is information that reflects the cooling-water heating amount of the heat pump 26 with high accuracy. The water temperature difference E is a difference between the EHR-outlet water temperature detected by the EHR-outlet temperature sensor 45 and the EHR-inlet water temperature detected by the EHR-inlet temperature sensor 48. The water temperature difference E is information that reflects the cooling-water heating amount of the exhaust-heat recovery device 44 with high accuracy. The water temperature difference F is a difference between the engine-inlet water temperature detected by the engine-inlet temperature sensor 33 and the EHR-outlet water temperature detected by the EHR-outlet temperature sensor 45. The water temperature difference F is information that reflects the amount of heat dissipated from the heater core 25 to the cooling water with high accuracy.

The outputs of the engine 11 and the heat pump 26 may be adjusted based on the engine temperature difference and the water temperature differences D, E and F. The flow rate of the cooling water may be adjusted based on the engine temperature difference and the water temperature differences D, E and F as well.

Eighth Embodiment

An eighth embodiment will be described hereafter referring to FIG. 16. In the eighth embodiment, parts different from the third and fourth embodiments will be described.

Figure 16:
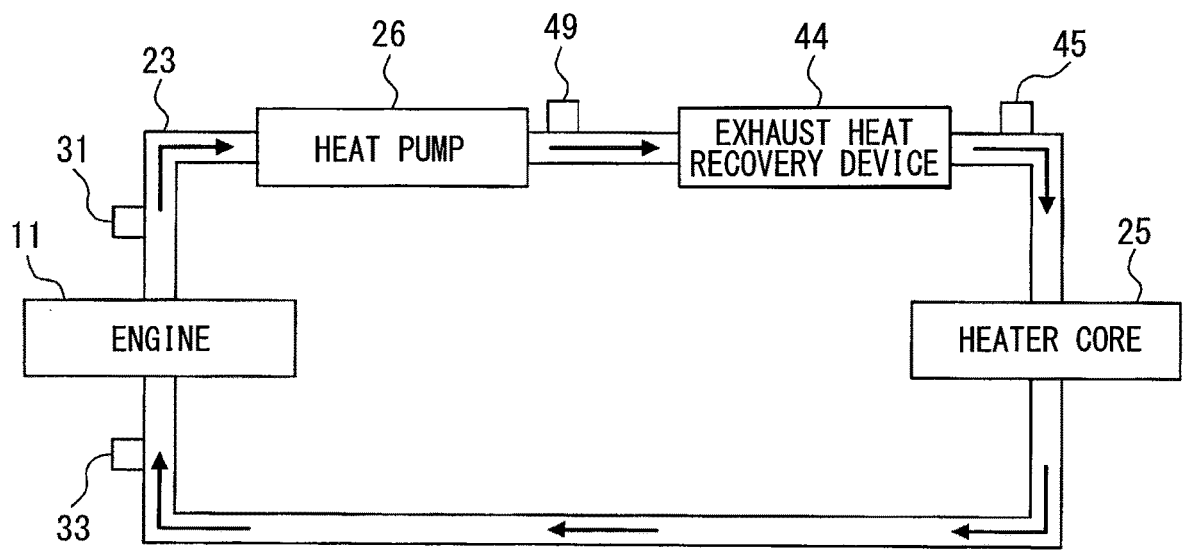
FIG. 16 is a diagram showing a schematic configuration of a cooling water circuit in a heating operation in an eighth embodiment.

In the eighth embodiment, the engine-inlet temperature sensor 33 is located upstream of the engine 11 and the engine-outlet temperature sensor 31 is located downstream of the engine 11 as shown in FIG. 16. In addition, an HP-outlet temperature sensor 49 is positioned around the outlet of the heat pump 26 on a downstream side of the heat pump 26. The HP-outlet temperature sensor 49 is configured to detect an HP-outlet water temperature which is a temperature of the cooling water flowing out of the heat pump 26. The EHR-outlet temperature sensor 45 is positioned downstream of the exhaust-heat recovery device 44.

In the eighth embodiment, the engine temperature difference, a water temperature difference G, a water temperature difference H, and a water temperature difference I are determined such that the output of the heat pump 26 is adjusted based on the engine temperature difference and the water temperature differences G, H and I.

The engine temperature difference is the difference between the engine-outlet water temperature detected by the engine-outlet temperature sensor and the engine-inlet water temperature detected by the engine-inlet temperature sensor 33. The water temperature difference G is a difference between the HP-outlet water temperature detected by the HP-outlet temperature sensor 49 and the engine-outlet water temperature detected by the engine-outlet temperature sensor 31. The water temperature difference G is information that reflects the cooling-water heating amount of the heat pump 26 with high accuracy. The water temperature difference H is a difference between the EHR-outlet water temperature detected by the EHR-outlet temperature sensor 45 and the HP-outlet water temperature detected by the HP-outlet temperature sensor 49. The water temperature difference H is information that reflects the cooling-water heating amount of the exhaust-heat recovery device 44 with high accuracy. The water temperature difference I is the difference between the engine-inlet water temperature detected by the engine-inlet temperature sensor 33 and the EHR-outlet water temperature detected by the EHR-outlet temperature sensor 45. The water temperature difference I is information that reflects the amount of heat dissipated from the heater core 25 to the cooling water with high accuracy.

The outputs of the engine 11 and the heat pump 26 may be adjusted based on the engine temperature difference and the water temperature differences G, H and I. The flow rate of the cooling water may be adjusted based on the engine temperature difference and the water temperature differences G, H and I as well.

Ninth Embodiment

A ninth embodiment will be described hereafter referring to FIG. 17. In the ninth embodiment, parts different from the third, fourth, fifth and eighth embodiments will be described.

Figure 17:
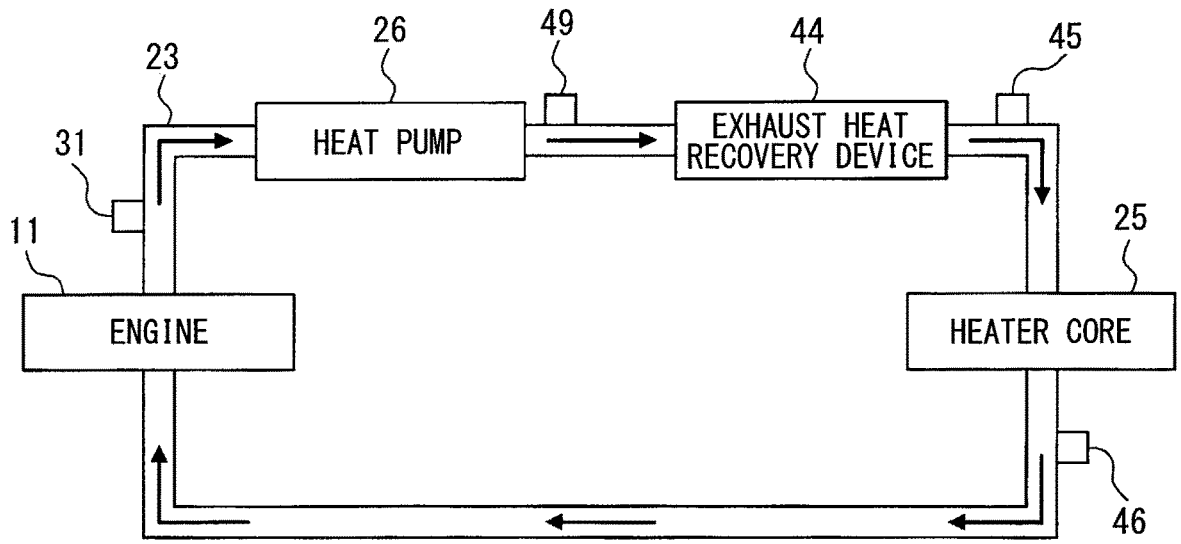
FIG. 17 is a diagram showing a schematic configuration of a cooling water circuit in a heating operation in a ninth embodiment.

In the ninth embodiment, the engine-outlet temperature sensor 31 is positioned downstream of the engine 11 and the HP-outlet temperature sensor 49 is positioned downstream of the heat pump 26 as shown in FIG. 17. In addition, the EHR-outlet temperature sensor 45 is positioned downstream of the exhaust-heat recovery device 44 and the HC-outlet temperature sensor 46 is positioned downstream of the heater core 25.

In the ninth embodiment, a water temperature difference J, a water temperature difference K, and a water temperature difference L, and a water temperature difference M are determined such that the output of the heat pump 26 is adjusted based on the water temperature differences J, K, L and M.

The water temperature difference J is the difference between the engine-outlet water temperature detected by the engine-outlet temperature sensor 31 and the HC-outlet water temperature detected by the HC-outlet temperature sensor 46. The water temperature difference J is information that reflects the cooling-water heating amount of the engine 11 with high accuracy. The water temperature difference K is a difference between the HP-outlet water temperature detected by the HP-outlet temperature sensor 49 and the engine-outlet water temperature detected by the engine-outlet temperature sensor 31. The water temperature difference K is information that reflects the cooling-water heating amount of the heat pump 26 with high accuracy. The water temperature difference L is a difference between the EHR-outlet water temperature detected by the EHR-outlet temperature sensor 45 and the HP-outlet water temperature detected by the HP-outlet temperature sensor 49. The water temperature difference L is information that reflects the cooling-water heating amount of the exhaust-heat recovery device 44 with high accuracy. The water temperature difference M is a difference between the HC-outlet water temperature detected by the HC-outlet temperature sensor 46 and the EHR-outlet water temperature detected by the EHR-outlet temperature sensor 45. The water temperature difference M is information that reflects the amount of heat dissipated from the heater core 25 to the cooling water with high accuracy.

The outputs of the engine 11 and the heat pump 26 may be adjusted based on the water temperature differences J, K, L and M. The flow rate of the cooling water may be adjusted based on the water temperature differences J, K, L and M as well.

Tenth Embodiment

A tenth embodiment will be described hereafter referring to FIG. 18. In the tenth embodiment, parts different from the third, sixth and seventh embodiments will be described.

Figure 18:
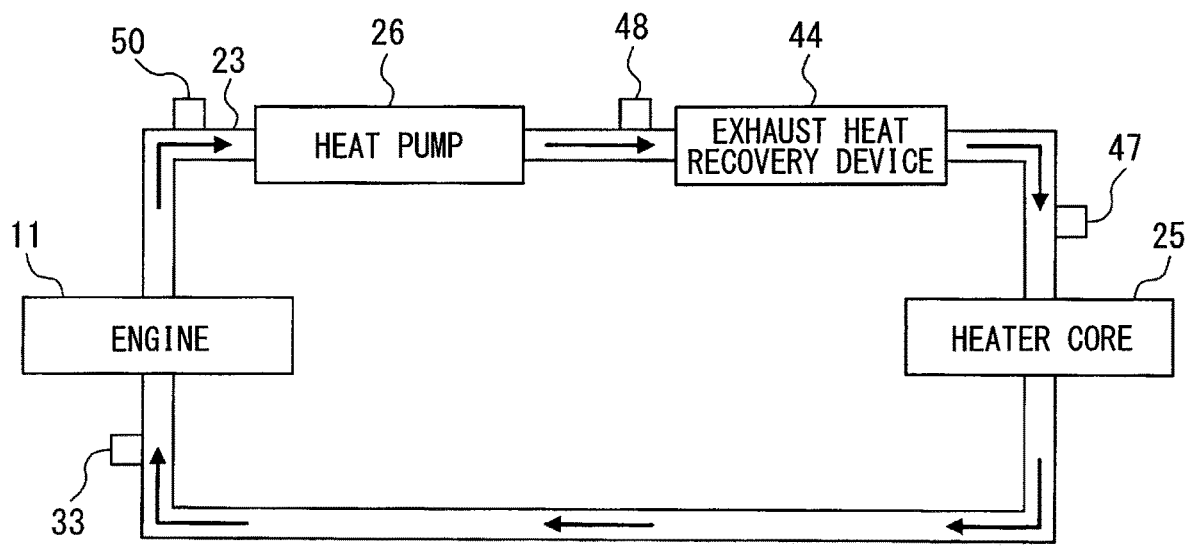
FIG. 18 is a diagram showing a schematic configuration of a cooling water circuit in a heating operation in a tenth embodiment.

In the tenth embodiment, the engine-inlet temperature sensor 33 is positioned upstream of the engine 11 as shown in FIG. 18. In addition, an HP-inlet temperature sensor 50 is positioned around the inlet of the heat pump 26 on the upstream side of the heat pump 26. The HP-inlet temperature sensor 50 is configured to detect an HC-inlet water temperature which is a temperature of the cooling water flowing into the heat pump 26. The EHR-inlet temperature sensor 48 is positioned upstream of the exhaust-heat recovery device 44 and the HC-inlet temperature sensor 47 is positioned upstream of the heater core 25.

In the tenth embodiment, a water temperature difference N, a water temperature difference O, and a water temperature difference P, and a water temperature difference Q are determined such that the output of the heat pump 26 is adjusted based on the water temperature differences N, O, P and Q.

The water temperature difference N is a difference between the HP-inlet water temperature detected by the HP-inlet temperature sensor 50 and the engine-inlet water temperature detected by the engine-inlet temperature sensor 33. The water temperature difference N is information that reflects the cooling-water heating amount of the engine 11 with high accuracy. The water temperature difference O is a difference between the EHR-inlet water temperature detected by the EHR-inlet temperature sensor 48 and the HP-inlet water temperature detected by the HP-inlet temperature sensor 50. The water temperature difference O is information that reflects the cooling-water heating amount of the heat pump 26 with high accuracy. The water temperature difference P is a difference between the HC-inlet water temperature detected by the HC-inlet temperature sensor 47 and the EHR-inlet water temperature detected by the EHR-inlet temperature sensor 48. The water temperature difference P is information that reflects the cooling-water heating amount of the exhaust-heat recovery device 44 with high accuracy. The water temperature difference Q is a difference between the engine-inlet water temperature detected by the engine-inlet temperature sensor 33 and the HC-inlet water temperature detected by the HC-inlet temperature sensor 47. The water temperature difference Q is information that reflects the amount of heat dissipated from the heater core 25 to the cooling water with high accuracy.

The outputs of the engine 11 and the heat pump 26 may be adjusted based on the water temperature differences N, O, P and Q. The flow rate of the cooling water may be adjusted based on the water temperature differences N, O, P and Q as well.

Other Embodiments

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The scope of the present disclosure includes all modifications that are equivalent to descriptions of the present disclosure or that are made within the scope of the present disclosure.

(1) In the above-described first to tenth embodiment, an electric heater or a combustion heater may be mounted instead of the heat pump 26. The electric heater is configured to heat the cooling water. For example, the electric heater may be a PTC heater, a carbon heater, or a sheathed heater. The combustion heater may combust the fuel for the engine 11 and may heat the cooling water using the combustion heat.

(2) In the above-described first to tenth embodiments, a water temperature sensor is mounted for the following reasons. Heat sources that are configured to heat the cooling water include a heat source of which output (e.g., amount of heat) is changed easily and a heat source of which output (e.g., amount of heat) is changed hardly. For example, the heat source easy to operate may be a heat pump, an electric heater, or a combustion heater. For example, the heat source hard to operate may be an engine or an exhaust-heat recovery device. When using the heat source easy to operate, the output thereof can be estimated easily. When using the heat source hard to operate, the output thereof is hardly estimated. Therefore, the water temperature sensor may be positioned downstream or upstream of the heat source easy to operate preferably so as to read the output of the water temperature sensor. For example, the water temperature sensor may be positioned around an outlet or an inlet of the heat source easy to operate, and then the output of the water temperature sensor is read. The more a quantity of the water temperature sensors is, the higher the cost is. Accordingly, the quantity of the water temperature sensors may be minimize preferably.

(3) In the above-described first to tenth embodiments, the hybrid ECU 39 operates the heating control routine and the flow rate control routine. However, another ECU other than the hybrid ECU 39 may operate the heating control routine and the flow rate control routine. For example, the ECU may be at least one of the engine ECU 40, the MG-ECU 41, or the air-conditioning ECU 42. Alternatively, the hybrid ECU 39 may operate the heating control routine and the flow rate control routine together with another ECU.

In the above-described first to tenth embodiments, a part of or an entirety of functions operated by the ECU may be configured, as hardware, by one or more devices such as IC.

(5) The present disclosure is not limited to be mounted to the vehicle having the above-described system shown in FIG. 1. For example, the vehicle may have various configurations including the engine, which is the power source for the vehicle, and the heater, which is configured to heat the cooling water for the engine.

The invention claimed is:

1. An air conditioner for a vehicle including an internal combustion engine as a power source, the engine being configured to allow a cooling water to flow therethrough and to heat the cooling water, the air conditioner including a cooling water circuit that allows the cooling water to circulate therein in a heating operation, the air conditioner comprising:
a heater that serves as a heat source, other than the engine, configured to heat the cooling water circulating in the cooling water circuit;
a plurality of temperature sensors that are connectable to the cooling water circuit and are configured to detect temperatures of the cooling water, the plurality of temperature sensors positioned upstream and downstream of at least one of the engine and the heater; and
an output controller that is configured to vary heat generated by the heater based on the temperatures of the cooling water detected by the plurality of temperature sensors.

2. The air conditioner for a vehicle according to claim 1, wherein
the plurality of temperature sensors include
an engine-inlet temperature sensor that is configured to detect a temperature of the cooling water flowing into the engine and
an engine-outlet temperature sensor that is configured to detect a temperature of the cooling water flowing out of the engine, and
the output controller is configured to vary the heat generated by the heater based on a temperature difference between the temperature detected by the engine-inlet temperature sensor and the temperature detected by the engine-outlet temperature sensor.

3. The air conditioner for a vehicle according to claim 2, wherein
when the temperature difference is greater than a specified value, the output controller decreases the heat generated by the heater to be smaller than the heat generated by the heater when the temperature difference is the specified value or smaller, or stops the heater.

4. The air conditioner for a vehicle according to claim 2, wherein
when the temperature difference is a specified value or smaller, the output controller increases the heat generated by the heater to be larger than the heat generated by the heater when the temperature difference is greater than the specified value.

5. The air conditioner for a vehicle according to claim 2, wherein
the heater is a heat pump, and
the output controller sets the heat generated by the heat pump based on the temperature difference.

6. The air conditioner for a vehicle according to claim 5, wherein
the output controller is configured to
calculate a property of a heat generating efficiency based on the temperature difference, the property being a ratio of an amount of heat, which is used to heat the cooling water, to an amount of fuel consumed by the engine,
calculate a property of a heat generating efficiency based on the temperature of the cooling water detected by the engine-outlet temperature sensor, the property being a ratio of the amount of heat to a consumption energy consumed by the heat pump, calculate the outputs of the engine and the heat pump based on the properties of the engine and the heat pump, and increase a total heat generating efficiency of the heat generating efficiencies of the engine and the heat pump to be a maximum efficiency under a condition of secured target amount of heat required for the heating operation.

7. The air conditioner for a vehicle according to claim 1, the air conditioner further comprising a flow rate adjuster that is configured to adjust a flow rate of the cooling water flowing into the engine based on a temperature difference between two temperatures detected by two temperature sensors of the plurality of temperature sensors.

8. The air conditioner for a vehicle according to claim 7, wherein the plurality of temperature sensors include an engine-inlet temperature sensor that is configured to detect a temperature of the cooling water flowing into the engine and an engine-outlet temperature sensor that is configured to detect a temperature of the cooling water flowing out of the engine, and when a temperature difference between the temperature detected by the engine-inlet temperature sensor and the temperature detected by the engine-outlet temperature sensor is smaller than a specified value, the flow rate adjuster decreases the flow rate to be smaller than a flow rate of the cooling water flowing into the engine when the temperature difference is the specified value or larger.

9. The air conditioner according to claim 1, wherein the vehicle is a hybrid vehicle having the internal combustion engine and an electric motor.

10. A vehicle comprising:

an internal combustion engine;

a cooling water circuit passing through the internal combustion engine such that cooling water in the cooling water circuit can be heated by the internal combustion engine;

a heater configured to selectively heat the cooling water in the cooling water circuit;

a plurality of temperature sensors that are configured to detect temperature of the cooling water in the cooling water circuit upstream and downstream of at least one of the internal combustion engine and the heater; and an output controller that is configured to vary heat generated by the heater based on the temperatures of the cooling water detected by the plurality of temperature sensors.

* * * * *